(12) United States Patent
Sam

(10) Patent No.: US 9,676,301 B2
(45) Date of Patent: Jun. 13, 2017

(54) VEHICLE SEAT WITH INTEGRATED CHILD BOOSTER DEVICE

(71) Applicant: Francis K. Sam, Richmond, VA (US)

(72) Inventor: Francis K. Sam, Richmond, VA (US)

( * ) Notice: Subject to any disclaimer, the term of this patent is extended or adjusted under 35 U.S.C. 154(b) by 0 days.

(21) Appl. No.: 14/881,343

(22) Filed: Oct. 13, 2015

(65) Prior Publication Data

US 2017/0101035 A1    Apr. 13, 2017

(51) Int. Cl.
*B60N 2/30* (2006.01)
*B60N 2/26* (2006.01)
*B60N 2/32* (2006.01)

(52) U.S. Cl.
CPC ............... *B60N 2/26* (2013.01); *B60N 2/30* (2013.01); *B60N 2/32* (2013.01)

(58) Field of Classification Search
CPC ............ B60N 2/26; B60N 2/30; B60N 2/32
See application file for complete search history.

(56) References Cited

U.S. PATENT DOCUMENTS

| | | | |
|---|---|---|---|
| 344,639 A | 6/1886 | Dewees | |
| 552,793 A | 1/1896 | Stoner | |
| 2,058,299 A * | 10/1936 | Cook | A47D 11/02 297/106 |
| 4,541,654 A * | 9/1985 | Jonasson | B60N 2/20 280/801.1 |
| 4,555,135 A * | 11/1985 | Freeland | B60N 2/3086 297/105 |
| 4,655,503 A * | 4/1987 | Kamijo | B60N 2/203 297/103 |
| 4,768,827 A * | 9/1988 | Musgrove | B60N 2/3086 297/15 |
| 4,936,627 A * | 6/1990 | Guim | B60N 2/3084 297/238 |
| 5,035,465 A * | 7/1991 | Hanai | B60N 2/3084 297/216.11 |
| 5,074,619 A * | 12/1991 | D'Orsi | A47C 3/04 108/11 |
| 5,121,964 A * | 6/1992 | Fourrey | B60N 2/283 297/236 |
| 5,205,608 A * | 4/1993 | Stig | B60N 2/3084 108/44 |
| 5,224,756 A * | 7/1993 | Dukatz | B60N 2/3084 297/114 |
| 5,260,684 A * | 11/1993 | Metzmaker | B60N 2/002 340/425.5 |
| 5,265,934 A * | 11/1993 | Forget | B60N 2/309 297/237 |

(Continued)

*Primary Examiner* — Philip Gabler

(57) ABSTRACT

A vehicle seat with integrated child booster device provides an integrated child booster deployable into a use position from a stowed position within a vehicle seat. The device includes a seat back coupled to and extending upwardly from a base frame. A seat bottom is slidably coupled to the base frame selectively covering and exposing an interior space of the base frame. A border section of the seat bottom is slidably coupled to the base frame and a central section of the seat bottom has an upright portion pivotally coupled to a seat portion along a first side of the central section. A second side of the central section is pivotally and slidably coupled to the border section. The upright portion is positionable adjacent to the seat back. A platform is vertically aligned under and supports the central section of the seat bottom.

12 Claims, 6 Drawing Sheets

(56) References Cited

U.S. PATENT DOCUMENTS

| | | | | |
|---|---|---|---|---|
| 5,280,995 | A * | 1/1994 | Elton | B60N 2/3084 |
| | | | | 280/807 |
| 5,332,284 | A | 7/1994 | Elton et al. | |
| 5,409,293 | A * | 4/1995 | Nagasaka | B60N 2/26 |
| | | | | 297/105 |
| 5,542,742 | A | 8/1996 | Fulgenzi et al. | |
| 5,553,918 | A * | 9/1996 | Baret | B60N 2/3047 |
| | | | | 297/237 |
| 5,568,959 | A * | 10/1996 | Weber | B60N 2/4613 |
| | | | | 297/238 |
| 5,588,700 | A * | 12/1996 | Homier | B60N 2/3084 |
| | | | | 297/14 |
| 5,639,144 | A * | 6/1997 | Naujokas | B60N 2/2827 |
| | | | | 297/216.11 |
| 5,700,054 | A | 12/1997 | Lang | |
| 5,704,684 | A * | 1/1998 | Dukatz | B60N 2/3084 |
| | | | | 297/238 |
| 5,722,724 | A * | 3/1998 | Takei | B60N 2/3084 |
| | | | | 297/114 |
| 5,788,326 | A * | 8/1998 | Kawade | B60N 2/2812 |
| | | | | 248/419 |
| 6,089,662 | A | 7/2000 | Lambert et al. | |
| 6,494,531 | B1 * | 12/2002 | Kim | B60N 2/0284 |
| | | | | 296/64 |
| 6,971,718 | B2 * | 12/2005 | Haglund | B60N 2/3086 |
| | | | | 297/236 |
| 7,029,063 | B2 * | 4/2006 | Holdampf | B60N 2/206 |
| | | | | 296/65.05 |
| 7,458,635 | B2 * | 12/2008 | Mendis | B60N 2/206 |
| | | | | 297/112 |
| 7,517,016 | B1 * | 4/2009 | West | B60N 2/3086 |
| | | | | 297/232 |
| 7,871,124 | B1 * | 1/2011 | Hinds | B60N 2/2806 |
| | | | | 297/234 |

* cited by examiner

VEHICLE SEAT WITH INTEGRATED CHILD BOOSTER DEVICE

BACKGROUND OF THE DISCLOSURE

Field of the Disclosure

The disclosure relates to vehicle seat devices and more particularly pertains to a new vehicle seat device for providing an integrated child booster deployable into a use position from a stowed position within a vehicle seat.

SUMMARY OF THE DISCLOSURE

An embodiment of the disclosure meets the needs presented above by generally comprising a seat back coupled to and extending upwardly from a base frame. A seat bottom is slidably coupled to the base frame selectively covering and exposing an interior space of the base frame. A border section of the seat bottom is slidably coupled to the base frame and a central section of the seat bottom has an upright portion pivotally coupled to a seat portion along a first side of the central section. A second side of the central section is pivotally and slidably coupled to the border section. The upright portion is positionable adjacent to the seat back. A platform is vertically aligned under and supports the central section of the seat bottom.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
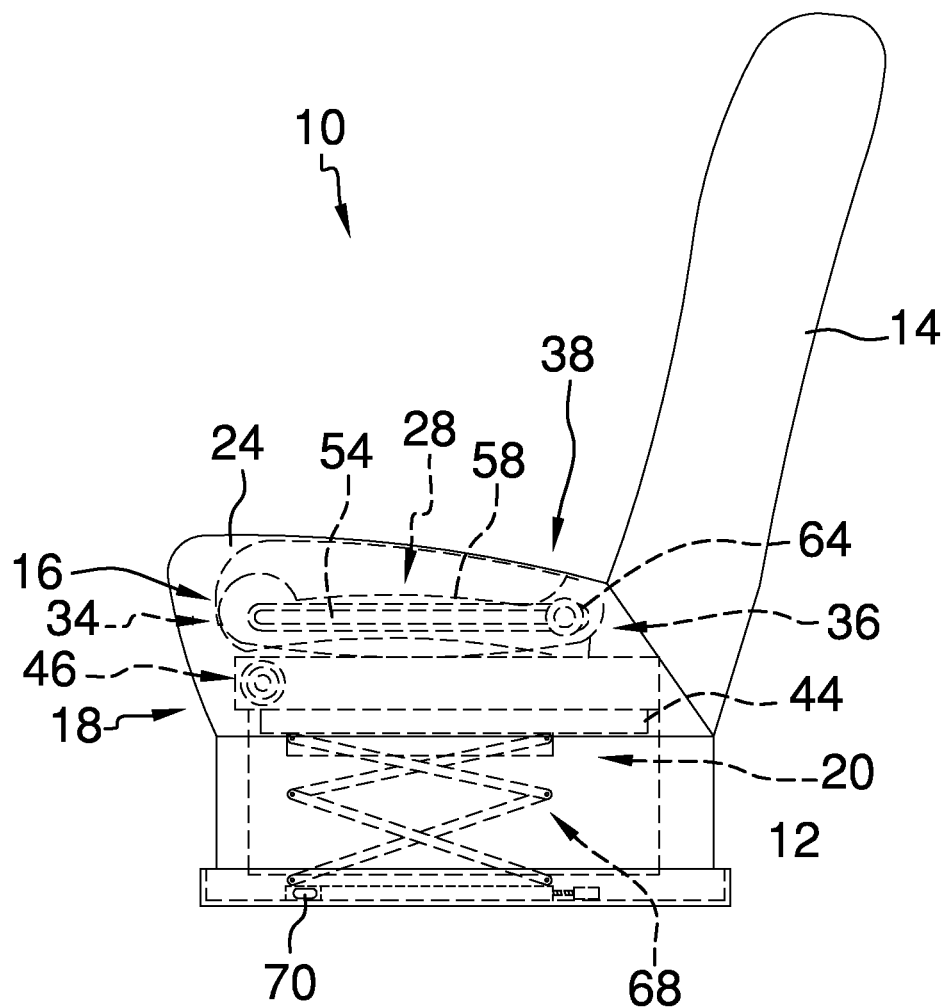
FIG. 1 is a side view of a vehicle seat with integrated child booster device according to an embodiment of the disclosure.
Figure 2:
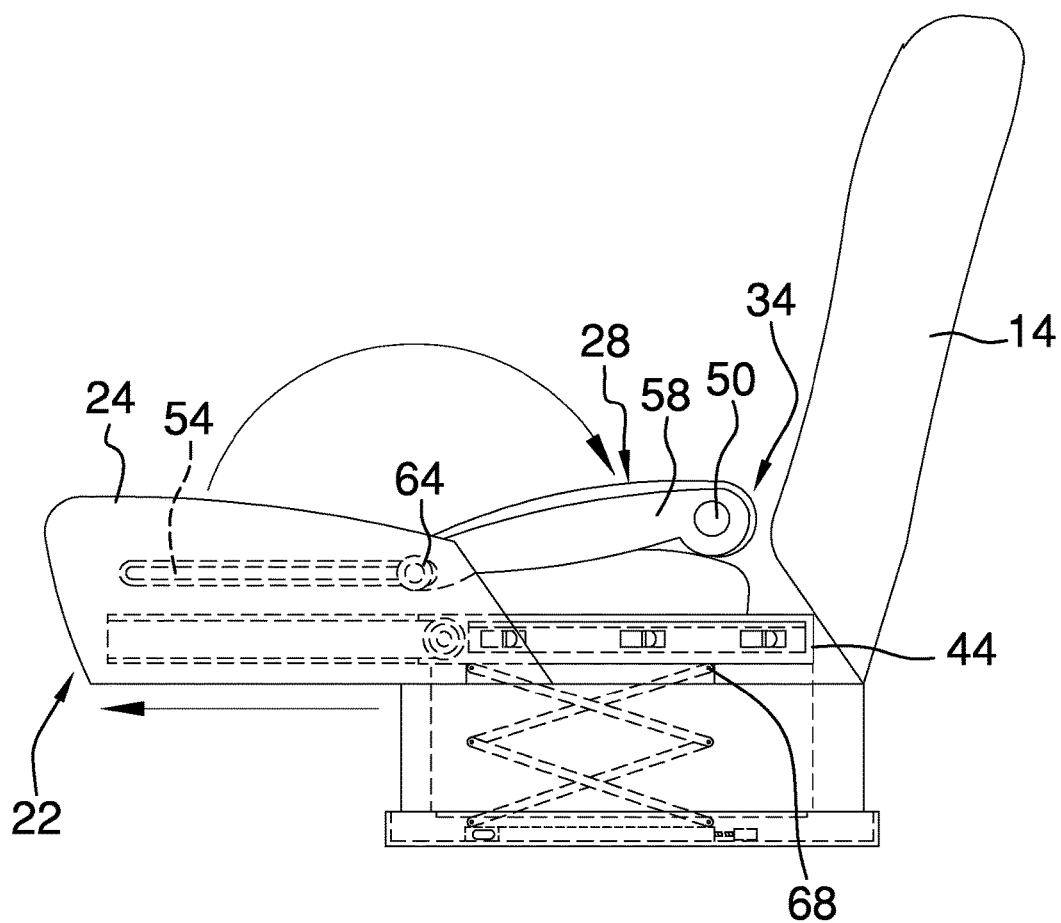
FIG. 2 is a side view of an embodiment of the disclosure in a first partially opened position.
Figure 3:
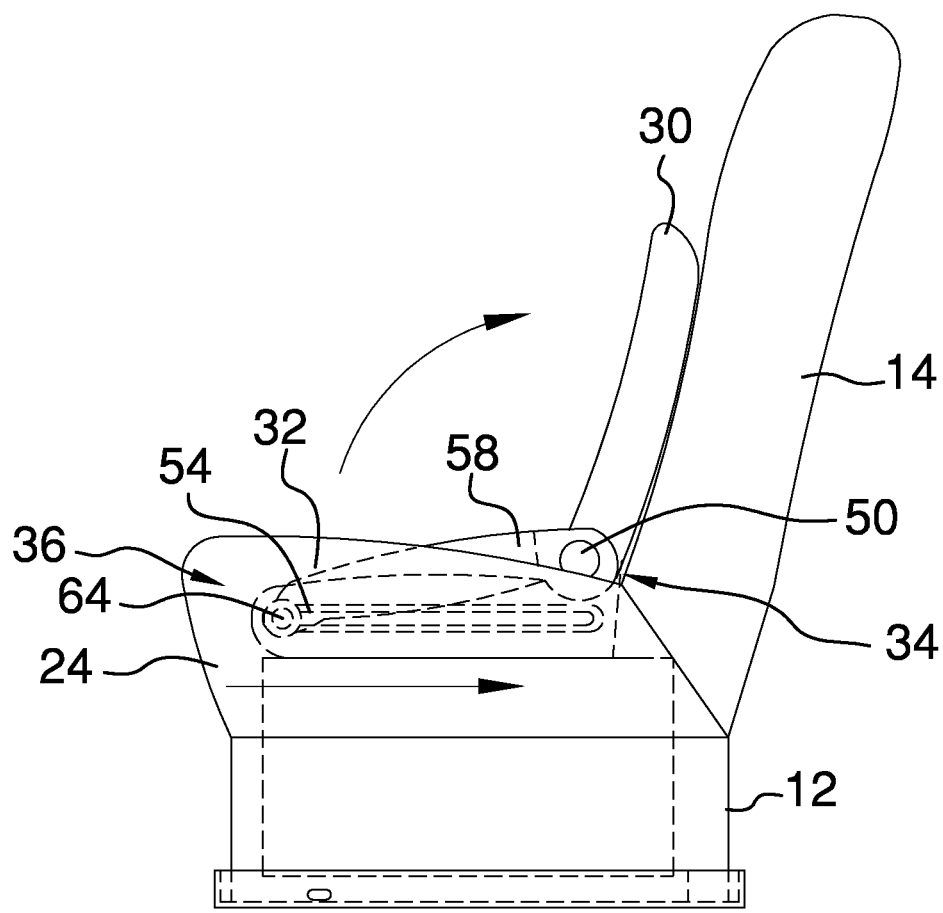
FIG. 3 is a side view of an embodiment of the disclosure in a second partially opened position.
Figure 4:
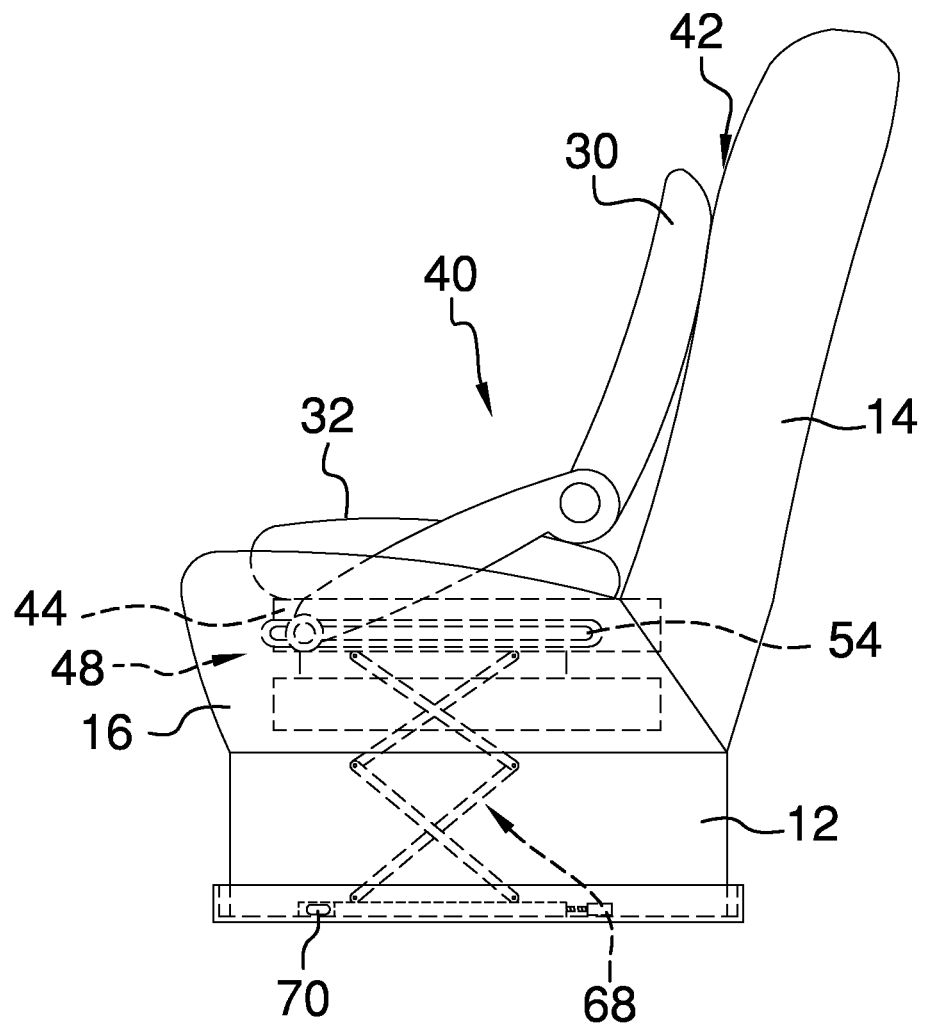
FIG. 4 is a side view of an embodiment of the disclosure in a booster position.
Figure 5:
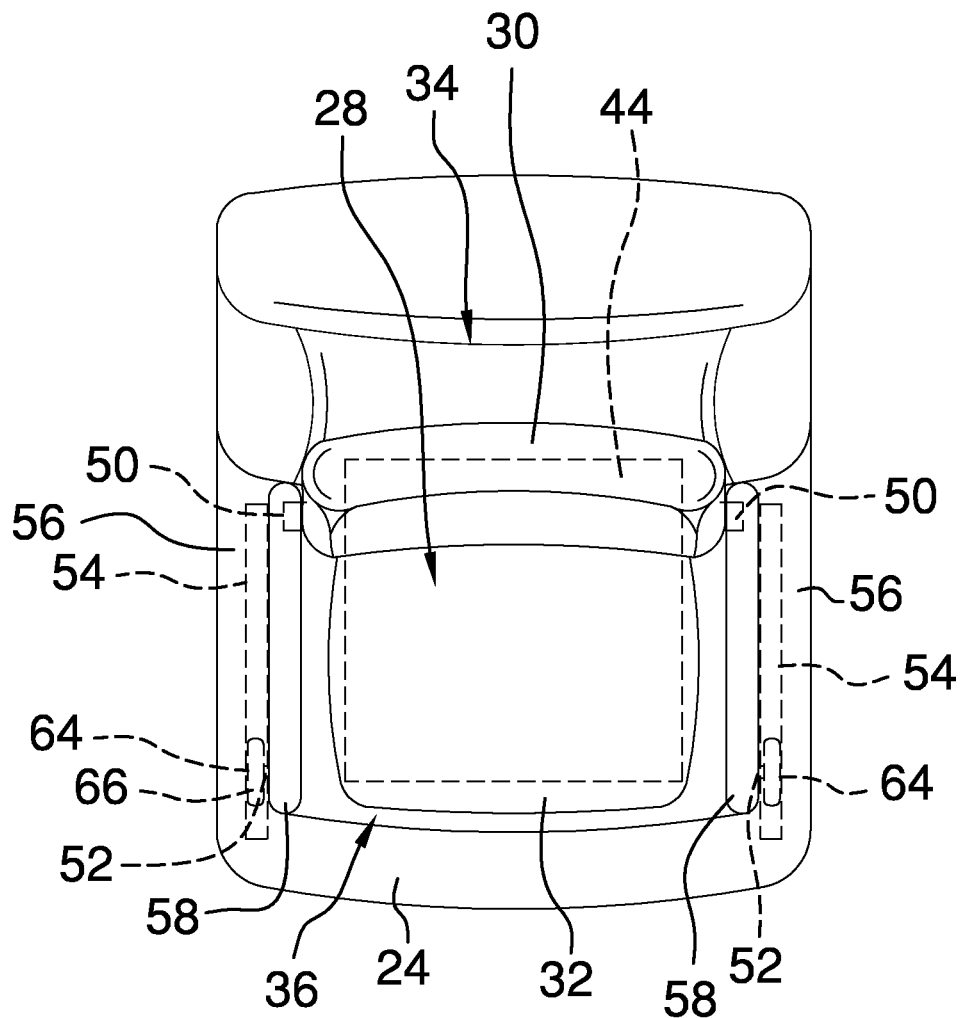
FIG. 5 is a top view of an embodiment of the disclosure in a booster position.
Figure 6:
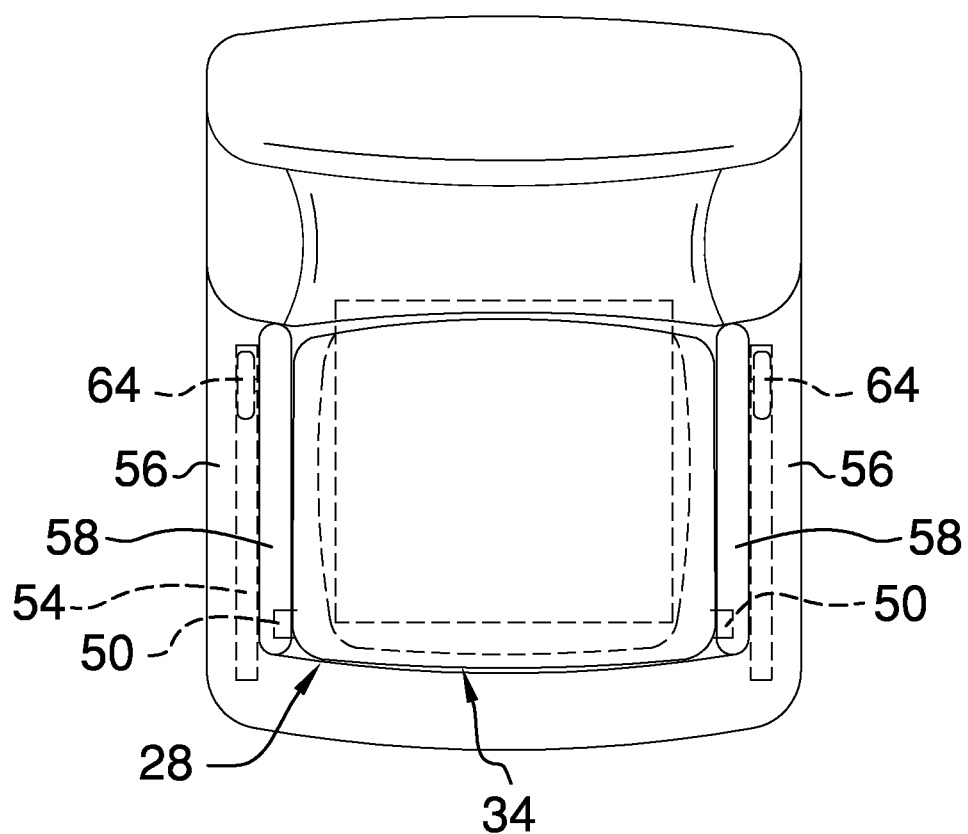
FIG. 6 is a top view of an embodiment of the disclosure in a seat position.

With reference now to the drawings, and in particular to FIGS. 1 through 6 thereof, a new vehicle seat device embodying the principles and concepts of an embodiment of the disclosure and generally designated by the reference numeral 10 will be described.

As best illustrated in FIGS. 1 through 6, the vehicle seat with integrated child booster device 10 generally comprises a base frame 12 defining an interior space 20. A seat back 14 is coupled to and extends upwardly from the base frame 12. A seat bottom 16 is slidably coupled to the base frame 12 to slide forward and backward in a generally horizontal plane when the device 10 is positioned in a vehicle. The seat bottom 16 is slidable between a first position 18 covering the interior space 20 of the base frame 12 and second position 22 wherein the interior space 20 of the base frame 12 is exposed. The seat bottom 16 further comprises a border section 24 slidably coupled directly to the base frame 12. The border section 24 is slidable using a conventional sliding connection wherein the border section 24 slides within and remains in a plane. A conventional locking mechanism may be employed to prevent forward sliding of the seat bottom 16 from the first position 18. A central section 28 has an upright portion 30 pivotally coupled to a seat portion 32 along a first side 34 of the central section 28. A second side 36 of the central section 28 opposite the first side 34 is pivotally and slidably coupled to the border section 24 as described in more detail below such that the central section 28 is adjustable between a seat position 38 and a booster position 40 relative to the border section 24. The upright portion 30 is pivotable into an extended position 42 adjacent to the seat back 14 when the central section 28 is in the booster position 40.

A platform 44 is positioned in the interior space 20 of the base frame 12. The platform 44 is vertically aligned under and supports the central section 28 of the seat bottom 16 in either the seat position 38 or the booster position 40. The platform 44 is movable between a lowered position 46 and an elevated position 48. The central section 28 is coplanar with the border section 24 when the platform 44 is in the lowered position 46 and the central section 28 is in the seat position 38 wherein the seat bottom 16 and the seat back 14 are configured for supporting an adult. The central section 28 is elevated relative to the border section 24 when the platform 44 is in the elevated position 48 and the central section 28 is in the booster position 40 wherein the seat portion 32 and the upright portion 30 are configured for supporting a child.

Each of a pair of hinges 50 pivotally couples the upright portion 30 to the seat portion 32 allowing for folding and unfolding of the central section 28. Each of a pair of pins 52 is coupled to and extends from the central section 28. Each of the pins 52 extends into a respective track 54 extending along a respective lateral section 56 of the border section 24 of the seat bottom 16. The hinges 50 are proximate the first side 34 of the central section 28 while the pins 52 are each proximate the second side 36 of the central section 28. Each of a pair of arms 58 is pivotally coupled to and extends between an associated one of the pins 52 and an associated one of the hinges 50 along respective sides 60 of the central section 28. Thus, the central section 28 may be pivoted into an inverted position relative to the border section 24. Each of a pair of rollers 64 is coupled to a distal end 66 of an associated one of the pins 52 relative to the central section 28. Each roller 64 is positioned within an associated track 54.

A lift 68 is positioned within the interior space 20 of the base frame 12 and coupled to the platform 44. The lift 68 elevates and lowers the platform 44 relative to the base frame 12. The lift 68 may be a scissor lift or the like. A control 70 is coupled to the base frame 12 and may be positioned on an exposed side of the base frame 12 in a conventional manner with other seat adjustment controls. The control 70 is operationally coupled to the lift 44 wherein manipulation of the control 70 selectively elevates and lowers the platform 44 adjusting a height of the central section 28 relative to the border section 24.

In use, the central section 28 is folded and inset relative to the border section 24 giving the appearance and function of a conventional vehicle seat while the platform 44 is in the lowered position 46. The seat bottom 16 is moved forward relative to the base frame 12 giving access and room to slide and pivot the central section 28 of the seat bottom 16 into an inverted position allowing the upright portion 30 to be pivoted relative the seat portion 32. The central portion 28 is then elevated by the lift 44 to a desired height relative to the border section 24 such that the central section 28 functions as a booster seat for a child.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle seat with integrated child booster device comprising:
   a base frame;
   a seat back coupled to and extending upwardly from said base frame;
   a seat bottom, said seat bottom being slidable relative to said base frame between a first position covering said interior space of said base frame and a second position wherein an interior space of said base frame is exposed, said seat bottom further comprising
      a border section slidably coupled to said base frame thereby providing a slidable coupling of the seat bottom relative to said base frame, and
      a central section having an upright portion pivotally coupled to a seat portion along a first side of said central section, a second side of said central section opposite said first side being pivotally and slidably coupled to said border section wherein said central section is adjustable between a seat position and a booster position relative to said border section, said upright portion being pivotable into an extended position adjacent to said seat back when said central section is in said booster position; and
   a platform positioned in said interior space of said base frame, said platform being vertically aligned under and supporting said central section of said seat bottom.

2. The device of claim 1, further comprising said platform being movable between a lowered position and an elevated position.

3. The device of claim 2, further comprising said central section being coplanar with said border section when said platform is in said lowered position and said central portion is in said seat position wherein said seat bottom and said seat back are configured for supporting an adult.

4. The device of claim 2, further comprising said central section being elevated relative to said border section when said platform is in said elevated position and said central section is in said booster position wherein said seat portion is configured for supporting a child.

5. The device of claim 1, further comprising a pair of pins coupled to and extending from said central section, each of said pins being positioned in a respective track extending along a respective lateral section of said border section of said seat bottom.

6. The device of claim 5, further comprising a pair of rollers, each of said rollers being coupled to a distal end of an associated one of said pins relative to said central section, each said roller being positioned within an associated said track.

7. The device of claim 1, further comprising a lift coupled to said platform, said lift elevating and lowering said platform relative to said base frame.

8. The device of claim 7, further comprising said lift being a scissor lift.

9. The device of claim 7, further comprising a control coupled to said base frame, said control being operationally coupled to said lift wherein manipulation of said control selectively elevates and lowers said platform.

10. The device of claim 1, further comprising a pair of hinges, each of said hinges pivotally coupling said upright portion to said seat portion.

11. The device of claim 1, further comprising:
   a pair of hinges, each of said hinges pivotally coupling said upright portion to said seat portion;
   a pair of pins coupled to and extending from said central section, each of said pins extending into a respective track extending along a respective lateral section of said border section of said seat bottom; and
   a pair of arms, each of said arms being pivotally coupled to and extending between an associated one of said pins and an associated one of said hinges.

12. A vehicle seat with integrated child booster device comprising:
   a base frame;
   a seat back coupled to and extending upwardly from said base frame;
   a seat bottom, said seat bottom being slidable relative to said base frame between a first position covering an interior space of said base frame and a second position wherein said interior space of said base frame is exposed, said seat bottom further comprising
      a border section slidably coupled to said base frame thereby providing a slidable coupling of the seat bottom relative to said base frame, and
      a central section having an upright portion pivotally coupled to a seat portion along a first side of said central section, a second side of said central section opposite said first side being pivotally and slidably coupled to said border section wherein said central section is adjustable between a seat position and a booster position relative to said border section, said upright portion being pivotable into an extended position adjacent to said seat back when said central section is in said booster position;

a platform positioned in said interior space of said base frame, said platform being vertically aligned under and supporting said central section of said seat bottom, said platform being movable between a lowered position and an elevated position, said central section being coplanar with said border section when said platform is in said lowered position and said central portion is in said seat position wherein said seat bottom and said seat back are configured for supporting an adult, said central section being elevated relative to said border section when said platform is in said elevated position and said central section is in said booster position wherein said seat portion is configured for supporting a child;

a pair of hinges, each of said hinges pivotally coupling said upright portion to said seat portion;

a pair of pins coupled to and extending from said central section, each of said pins extending into a respective track extending along a respective lateral section of said border section of said seat bottom;

a pair of arms, each of said arms being pivotally coupled to and extending between an associated one of said pins and an associated one of said hinges;

a pair of rollers, each of said rollers being coupled to a distal end of an associated one of said pins relative to said central section, each said roller being positioned within an associated said track;

a lift coupled to said platform, said lift elevating and lowering said platform relative to said base frame, said lift being a scissor lift; and a control coupled to said base frame, said control being operationally coupled to said lift wherein manipulation of said control selectively elevates and lowers said platform.

* * * * *